United States Patent

Nomoto et al.

Patent Number: 5,186,768
Date of Patent: Feb. 16, 1993

[54] FLAT SPRING HOSE CLAMP AND MANUFACTURE OF SAME

[75] Inventors: Masai Nomoto, Toyoake; Koichi Sakurai, Aichi; Takashi Suzuki, Nagoya; Kiyoshi Fukui, Nishinomiya; Atsuki Okamoto, Ashiya, all of Japan

[73] Assignees: Sumitomo Metal Industries, Ltd., Osaka; Togo Seisakusyo Corporation, Aichi, both of Japan

[21] Appl. No.: 714,823

[22] Filed: Jun. 13, 1991

[30] Foreign Application Priority Data

Jun. 14, 1990 [JP] Japan .................. 2-156025

[51] Int. Cl.⁵ .................................. C21D 9/02
[52] U.S. Cl. ........................... 148/580; 148/654; 148/660; 148/333; 148/334; 148/908; 420/104; 420/105; 420/106; 420/110
[58] Field of Search .......... 148/12.4, 12 F, 354, 148/333, 908, 580, 654, 660; 420/104, 105, 106, 110

[56] References Cited

U.S. PATENT DOCUMENTS 3,528,088 1/1968 Seghezzi et al. .................. 148/334

FOREIGN PATENT DOCUMENTS 59-123716 7/1984 Japan .
60-9824 1/1985 Japan .
60-9825 1/1985 Japan .
61-76615 4/1986 Japan .

Primary Examiner—R. Dean
Assistant Examiner—Sikyin Ip
Attorney, Agent, or Firm—Burns, Doane, Swecker & Mathis

[57] ABSTRACT

A flat spring hose clamp having an improved resistance to brittle fracture and a method for manufacturing the same are disclosed, the hose clamp being made of a steel having a steel composition consisting essentially of, by weight %:
C: 0.30–0.70%,
Si: 0.70% or less,
Mn: 0.05–1.00%,
P: 0.030% or less,
S: 0.020% or less,
Cr: 0.50–2.00%,
Mo: 0.10–0.50%,
Nb: 0.005–0.100%,
sol. Al: 0.10% or less,
N: more than 0.0020%, but not more than 0.015%,
Ti: 0–0.10% and/or B: 0–0.0020%, and a balance of Fe and incidental impurities, and the steel possessing a uniform bainite structure.

24 Claims, 4 Drawing Sheets

FLAT SPRING HOSE CLAMP AND MANUFACTURE OF SAME

BACKGROUND OF THE INVENTION

This invention relates to a flat spring member for use in attaching a flat or tubular member to an object. More particularly, this invention relates to a flat spring hose clamp for use in attaching an automobile tubular part and a method for manufacturing it.

The flat spring hose clamp of this invention is superior to that of the prior art with respect to strength after heat treatment and resistance to brittle fracture which is sometimes experienced during manufacture, transportation, and use of it.

A flat spring hose clamp, in particular that for use in automobiles, is used to fix a tubular member such as a hose, pipe, or wire to an object which is also an automobile part.

Figure 1:
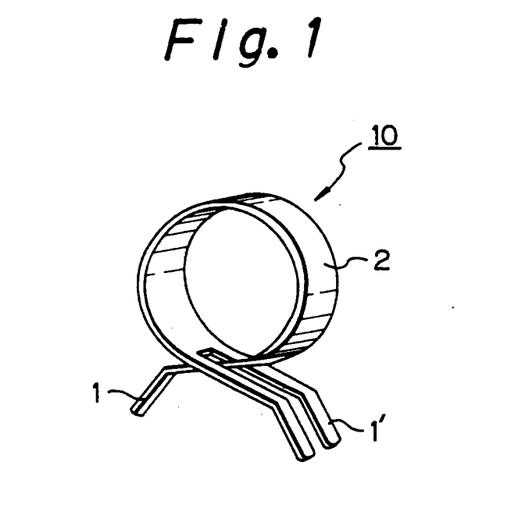
FIG. 1 and FIG. 2 are schematic perspective views of a flat spring hose clamp of the present invention.
Figure 2:
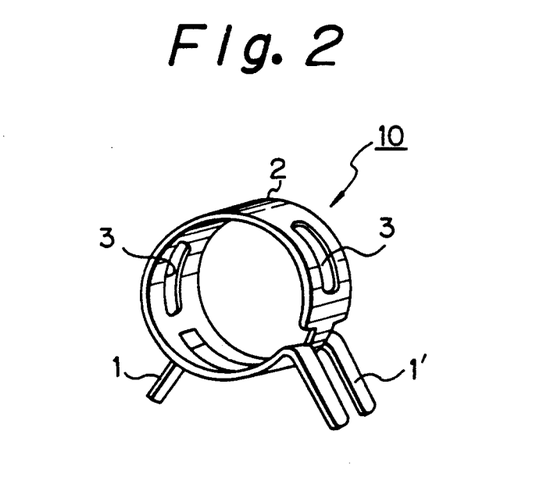

A typical flat spring hose clamp for use in automobiles is schematically shown in FIGS. 1 and 2, in which a flat spring hose clamp 10 for use in automobiles consists of a plate spring 2 and mating parts 1, 1' provided at the both ends of the plate. The plate spring 2 is bent so that the both ends cross each other. If necessary, a punched through-hole 3 as shown in FIG. 2 may be provided along the longitudinal length of the plate spring 2.

Such articles are manufactured from a high carbon steel such as S30CM-S70CM, or SK7M-SK4M and a low alloy high carbon steel such as SCM435 or SCM445, as specified in JIS G 3311 or JIS G 4802. These high carbon steels and low alloy, high carbon steels are, if necessary after hot rolling and descaling by pickling, subjected to cold rolling as well as spheroidizing by heating the steel at a temperature of around the $Ac_1$ point for an extended period of time in order to improve accuracy of the thickness of the sheet and its formability including its suitability for blanking, bending, and pressing. After forming into a final shape, as shown in FIGS. 1 and 2, heat treatment such as quenching and tempering, austempering, and the like is performed to strengthen the article being manufactured, resulting in improvement in hardness, tensile strength, and spring properties.

Therefore, steel sheet for use in manufacturing these articles must exhibit a relatively high degree of strength and hardness as well as spring properties only after heat treatment. For this purpose it is necessary to employ steel with a high carbon content (C: not smaller than 0.50%). Since these properties of the final articles of such a high carbon steel are influenced by heat treatment conditions, and especially the tempering temperature, a tempering temperature of up to 500° C., usually in the range of 200°–450° C. is carefully chosen depending on the levels of properties, including hardness, tensile strength, and spring action, required for the article.

However, the before-mentioned thin steel sheets of the high carbon steel specified in JIS suffer from an increase in size of austenitic grains and precipitation of phosphorous along austenitic grain boundaries in the course of heat treatment. Therefore, sometimes brittle fracture takes place for a hose clamp adjusted to a strength level of 150 kgf/mm² or higher, even if the heat treatment conditions are determined carefully.

A typical conventional flat spring hose clamp is shown in FIGS. 1 and 2. It consists of a plate spring 2 in a bent form to provide a clamp portion and a pair of mating parts 1, 1'. These have been manufactured by using high strength steel plate with a T.S. of 150 kgf/mm² or higher, obtained by applying austempering to a high carbon steel (S50CM, SK5M, SK7M etc.) containing 0.50–0.85% of carbon, since a strong degree of spring action is required. However, since it has a high degree of strength, cracking due to embrittlement occurs in an area where stress is concentrated, during either shelf storage or use under tension.

In order to avoid brittle fracture it is necessary to suppress an increase in strain, due to a high content of carbon, during heat treatment such as quenching, tempering, austempering and the like. For this purpose, it is advisable to employ a CrMo system, low-alloy steel, such as SCM435, SCM445 etc. that contains an amount of carbon reduced to 0.50% or smaller.

Furthermore, it is also advisable to prepare a fine austenitic crystal grain structure and to prevent propagation of cracking within the steel. For this purpose it is necessary to suitably adjust the chemical composition of the steel including chemical components such as Al and N. In particular, in order to refine the austenitic grain structure it is common to precipitate fine particles of AlN and the like during slab heating or soaking before quenching or austempering.

However, in spite of such efforts to improve the resistance to brittle fracture the level of resistance which has been achieved in the prior art is not enough to satisfy the level of the resistance which is required for up-to-date hose clamps.

SUMMARY OF THE INVENTION

An object of the present invention is to provide a flat spring hose clamp and a method for manufacturing the same, which is made of a steel having a strength on the level of 150 kgf/mm² or higher and which is highly resistant to cracking due to embrittlement.

Another object of the present invention is to provide a flat spring hose clamp and a method for manufacturing the same, which is made of a steel having a strength on the level of 150 kgf/mm² or higher and being free from "fatigue weakening" which is sometimes found for spring steels.

As mentioned before, in order to improve shock-resistance and the resistance to cracking due to embrittlement of the hose clamp austempering instead of quenching and tempering is usually employed. As the amount of austempered steel which is used to manufacture hose clamps increases, it is required to further shorten the length of time needed to achieve austempering.

However, when the heating time for achieving austempering is shortened, sometimes transformation from a pre-structure, i.e., ferrite-pearlite structure into an austenitic structure does not take place sufficiently for the before-mentioned low carbon, low alloy steel, resulting in a local concentration of carbon, which causes formation of a mixed structure of martensite and bainite after austempering. The presence of such a mixed structure adversely affects the shock-resistance and the resistance to cracking due to hydrogen embrittlement, for example.

Thus, it is necessary to improve the resistance to shock as well as to cracking due to embrittlement for steel which has been austempered for a shortened period of time.

The inventors of the present invention have studied a high strength steel as a starting material for manufacturing hose clamps and made the following discoveries.

(1) In order to increase the hardness as well as tensile strength of a high carbon steel plate, it is necessary to increase the resistance to softening after austempering. For this purpose carbon in an amount of 0.30% or more, chromium in an amount of 0.50% or more, and molybdenum in an amount of 0.10% or more are incorporated in a steel composition. In particular, a uniform bainite structure is desirable so as to avoid degradation in resistance to shock as well as in cracking due to embrittlement, and for this purpose, as well as for improving resistance to softening, it is necessary to add carbon in an amount a little higher than the carbon content of a conventional CrMo Steel as defined in JIS G 3311.

Furthermore, in order to ensure tensile strength at the level of 150–200 kgf/mm$^2$, it is desirable to carry out heating at a temperature of 800°–900° C. higher than a conventional heating temperature and tempering at a temperature of 400° C. or lower.

(2) It is necessary to promote formation of a stable bainite structure and suppress transformation into a martensite structure in order to prevent "fatigue weakening" for a spring steel.

(3) In the past, it was thought to be impossible to completely prevent a high strength steel at the level of 150 kgf/mm$^2$ or higher from suffering from hydrogen embrittlement and brittle fracture at a notch. However, even for such a high strength steel, when a specific amount of Nb (0.005–0.100%) is incorporated into the steel, austenitic grains are finely divided and the propagation of cracking due to hydrogen embrittlement is suppressed markedly.

Additionally, 0.005–0.10% of Ti is added, Ti(CN) and TiNb(CN) are formed during slab heating or soaking before quenching or austempering so that the grain growth of austenite phase is markedly suppressed.

When the content of P is reduced to 0.030% or less, the amount of P precipitated along austenitic grain boundaries is also reduced, resulting in an improvement in the toughness of the resulting material. The presence of a large amount of P precipitated along grain boundaries causes grain boundary embrittlement, sometimes resulting in brittle fracture.

It is known that when a suitable amount of B is added, B precipitates along grain boundaries preferentially to P so that the precipitation of P is suppressed. Therefore, the grain boundaries can be strengthened by adding B without reducing the content of P to an extremely low level.

When the S content is reduced to 0.020% or less, a reduction in the Mn content can greatly improve toughness because formation of MnS is eliminated. In contrast, when the Mn content is high, due to the presence of a high amount of Mn, the precipitation of P along grain boundaries is promoted. However, when the Mn content is lowered, the precipitation of P along grain boundaries can be successfully prevented. Usually when the Mn content is small, it is expected that hardenability is degraded, but the steel sheet manufactured by the present invention is very thin, and hardenability is not a serious problem. In addition, due to incorporation of Cr and Mo, the strength of the resulting steel is ensured, and the upper limit of the Mn content may be 1.00%.

When the amounts of C, Cr, and Si which are necessary to strengthen the steel are excessive, the resistance to brittle fracture is degraded. Therefore, the upper limit may be 0.70% for carbon, 0.70% for silicon, and 2.00% for chromium.

Thus, the present invention resides in a flat spring hose clamp which is made of a steel having a steel composition consisting essentially of, by weight %:

C: 0.30–0.70%,
Si: 0.70% or less,
Mn: 0.05–1.00%,
P: 0.030% or less,
S: 0.020% or less,
Cr: 0.50–2.00%,
Mo: 0.10–0.50%,
Nb: 0.005–0.100%,
sol. Al: 0.10% or less,
N: more than 0.002%, but not more than 0.015%,
optionally Ti: 0.005–0.10% and/or B: 0.0003–0.0020%, and the balance being Fe and incidental impurities, the steel comprising a uniform bainite structure.

Another aspect of the present invention is a method of manufacturing a flat spring hose clamp having an improved resistance to brittle fracture, which comprises the steps of heating a steel having the steel composition mentioned above, after forming into a shape of clamp, at a temperature of 800°–900° C., and carrying out austempering by cooling rapidly and maintaining at a temperature of 240°–400° C. to form a uniform bainitic structure.

The "uniform" bainitic structure herein means a bainitic structure substantially free from a ferrite phase and a martensite phase.

DESCRIPTION OF THE PREFERRED EMBODIMENTS

The reasons for defining the steel composition which is used in the present invention as above will now be described.

C (Carbon)

In order to provide a steel with a satisfactory level of hardness, strength, hardenability and wear resistance, 0.30% or more of carbon is added. When the carbon content is over 0.70%, formability before heat treatment is degraded and toughness after heat treatment is much impaired. Therefore, in the present invention the carbon content is defined as 0.30–0.70%, preferably 0.40–0.60%.

Si (Silicon)

The addition of Si is not absolutely necessary. When the content of Si is over 0.70%, there is a tendency for the steel to become hard and brittle to some extent. The Si content is restricted to not greater than 0.70%. At least 0.10% of Si is added so as to ensure hardenability. Preferably, the Si content is 0.15–0.40%.

Mn (Manganese)

Since the present invention is directed to a flat spring hose clamp, the content of Mn is reduced so as to improve toughness. In fact, when the amount of Mn is over 1.0%, the hardness after heat treatment is much greater than that required, resulting in a degradation in toughness. On the other hand, when the Mn content is lower than 0.05%, the amount of sulfur which is dissolved in the steel increases and embrittlement during hot working is inevitable, resulting in a degradation in productability of steel sheet. The Mn content is restricted to 0.05-1.00%, and preferably not greater than 0.80%.

P (Phosphorous)

Phosphorous precipitates along grain boundaries of austenite before transformation, and it has a great influence on degradation in the resistance to embrittlement such as intergranular fracture. Therefore, the lower the phosphorous content the better with respect to toughness. According to the present invention, the P content is restricted to 0.030% or less. However, it is preferable to further lower the P content when a relatively large amount of Si and Mn is incorporated. For this purpose, it is desirable to restrict the P content to not greater than 0.015%. From the viewpoint of steel making it is desirable to define the lower limit of the P content as 0.010% to avoid adding to manufacturing costs.

Precipitation of phosphorous along grain boundaries is suppressed by the addition of boron. This is because boron precipitates along the grain boundaries in preference to phosphorous, resulting in less precipitation of phosphorous. Thus, the austenite grain boundaries may be strengthened by the addition of B. This is the same as when the content of P is reduced.

S (Sulfur)

The smaller the content, the more effectively is the precipitation of MnS suppressed. This is desirable from the viewpoint of improving toughness. Therefore, the S content is defined as 0.020% or less, and preferably 0.010% or less.

The S content can be reduced either by adding Ca alone or by adding Ca-Si. However, when Ca is added in an amount of more than 0.02%, large inclusions are easily formed. Therefore, it is desirable to add Ca in an amount of not more than 0.02%.

Cr (Chromium)

Cr is added mainly for the purpose of improving hardenability. When Cr is added in an amount of larger than 2.0%, the steel becomes hard, resulting in embrittlement. Therefore, the Cr content is restricted to 0.50-2.00%, preferably to 0.80-1.5%.

Mo (Molybdenum)

The addition of Mo is important. When Mo in an amount of 0.10% or more is added, ;t is effective for maintaining a high degree of toughness after heat treatment without degradation in formability before heat treatment (quenching and tempering) of steel sheet. Generally, when a steel is tempered at around 300° C. after quenching, a so-called "low temperature temper brittleness (cold brittleness)" occurs with a marked degradation in toughness. However, sometimes it is necessary to carry out low temperature tempering at around 300° C. in order to obtain a desirable level of hardness. In fact, there is a tendency for temper brittlement of a thin steel sheet to be less serious than that of a thick steel sheet, and that lower temperature tempering may be employed for a thin steel sheet. However, even a very small deterioration in toughness is inevitable. The addition of Mo in an amount of 0.10% or larger is very effective for compensating for a reduction in toughness of this level. When the Mo content is larger than 0.50%, it adds to manufacturing costs, so the upper limit of Mo content is defined as 0.50%. Preferably, the Mo content is 0.20-0.45%.

Nb (Niobium)

Nb is effective in refining austenite grains to improve the toughness of the steel. Refinement of austenite grains is also very effective at suppressing hydrogen embrittlement fracture. When Nb is added in an amount of less than 0.005%, its effects are inadequate. On the other hand, when Nb is added in an amount of larger than 0.100%, the effectiveness of its addition saturates. Thus, the Nb content is restricted to 0.005-0.100%. In a further restricted embodiment, the Nb content is 0.030-0.060% Preferably, the ratio of Ti/Nb is about 0.1-0.7 so as to form a TiNb system precipitate.

Ti (Titanium)

Ti is an optional element. The addition of Ti is effective for improving hardenability of the steel. The Ti is also effective for increasing hardness and tensile strength of steel by means of forming and finely dispersing TiN or TiC. Furthermore, Ti combines with Nb to form a complex precipitate TiNb(CN) which promotes refinement of austenite grains. When B is also added, the presence of Ti suppresses the precipitation of BN within a grain and the precipitation of P along grain boundaries to avoid a degradation in the resistance to mechanical shock and hydrogen embrittlement. However, when the Ti content is less than 0.005%, the above-mentioned advantages cannot be obtained. The addition of Ti in an amount of larger than 0.10% adds to manufacturing costs and results in hardening of the steel. The Ti content is defined as 0.005-0.10%. It is desirable to add Ti in an amount not exceeding the amount of Nb in order to form a TiNb system complex precipitate.

B (Boron)

B is an optional element, but it is effective for suppressing the precipitation of P along grain boundaries by the preferential precipitation of B. The strengthening of grain boundaries due to the preferential precipitation of B is also effective for improving resistance to brittle fracture. When B is added in an amount of 0.0003% or more, the occurrence of brittle fracture is markedly suppressed. However, its effectiveness saturates when it is added in an amount in excess of 0.002(%, and BN or $Fe_2B$ is formed, resulting in a degradation in resistance to brittle fracture. Thus, according to the present invention, the content of B is restricted to not greater than 0.0020%.

sol. Al (Solution aluminum)

Al is optionally added to steel as a deoxidizing agent. When the content of Al is over 0.10%, it adds to manufacturing costs and makes the resulting steel hard. In view of grain size control of an austenitic grain, which is carried out by the introduction of AlN, the addition of an excess amount of Al, i.e., the introduction of an excess amount of AlN, is undesirable. Thus, the addition of Al in an amount of not greater than 0.10% is permissible.

N (Nitrogen)

The incorporation of nitrogen is effective for improving the hardness and tensile strength of steel. The presence of nitrogen is also effective for suppressing grain growth of austenitic grains by the formation of AlN, TiN, and the like, resulting in an improvement in toughness. For this purpose the N content is restricted to larger than 0.0020%. However, when the N content is over 0.015%, formability before quenching is impaired because of an increase in hardness. Therefore, the upper limit is defined as 0.015%.

The method of manufacturing a flat spring hose clamp of the present invention will be described.

The flat spring hose clamp may be shaped through a conventional means, such as punching and pressing. A shaping method therefore is not restricted to a specific one. Typically, a steel strip -s first subjected to blanking and then to punching to prepare a blank. One or more times of bending is applied to the blank to provide a shape such as shown in FIG. 1 and FIG. 2. An austempering treatment which will be detailed hereunder is applied to provide a final product.

It is herein to be noted that the shape of the hose clamp of the present invention is not restricted to a specific one as long as it is of the flat spring type.

In carrying out the above-mentioned austempering it is necessary to effect soaking of the clamp at a temperature of 800° C. or higher so as to dissolve cementite particles into an austenitic structure. When the soaking temperature is lower than 800° C., cementite particles sometimes remain in steel after austempering. On the other hand, when the soaking temperature is higher than 900° C., austenitic grains grow excessively, resulting in deterioration in brittle fracture resistant properties. Thus, the soaking temperature is restricted to 800-900° C.

The soaking time is not restricted, but it is desirable to continue for three minutes or longer so as to thoroughly dissolve cementite particles into an austenitic phase. On the other hand, when the soaking is continued for longer than 40 minutes, austenitic grains grow excessively, resulting in deterioration in brittle fracture resistant properties. Thus, the upper limit of soaking time is desirably 40 minutes. Preferably, the soaking time is 10-30 minutes.

The lower limit of austempering temperature is defined as 240° C. so as to form a uniform bainite structure. When the austempering temperature is lower than 240° C., sometimes a martensite phase is formed, resulting in a deterioration in the resistance to brittle fracture and in toughness. The upper limit is defined as 400° C. When the temperature is higher than 400° C. cementite particles in the bainite phase grow coarsely resulting in decreased strength. Furthermore, depending on its steel composition, an austenite phase remains at room temperature, which is transformed into a martensite structure after austempering. The formation of such a martensite structure has an adverse effect on the resistance to brittle fracture. Thus, the austempering temperature is restricted to 240°-400° C.

According to the present invention, the austempering time is not restricted. However, in a preferable embodiment, austempering is continued for 10 minutes or longer in order to form a uniform bainite structure. When tempering is continued for a shorter period of time than 10 minutes, a martensite phase is sometimes formed during cooling. On the other hand, when austempering is continued longer than 60 minutes, it adds to manufacturing costs. It is desirable to restrict the upper limit of austempering time to 60 minutes. Preferably, the austempering time is 30-50 minutes.

The thus-produced flat spring hose clamp of the present invention may be further treated, if necessary, by rust prevention treatment such as electric zinc plating, and baking zinc coating, and after such finish treatment the hose clamp can be used for connecting rubber hoses to pipes in the assembly line for automobiles and the like.

The flat spring hose clamp of the present invention can exhibit a fix pressure higher than the conventional clamp and has improved properties including the resistance to "fatigue weakening" at high temperatures as well as brittle fracture.

The present invention will be further described in detail in conjunction with working examples compared with comparative examples.

EXAMPLE 1

Cold rolled steel plates each with a thickness of 1.0 mm were prepared from Steel Nos. 1-13 of Table 1. A suitable austempering treatment was applied to adjust a tensile strength thereof to about 180 kgf/mm$^2$. From the resulting austempered steel plates, test pieces with a notch 12.5 mm wide, 2.0 mm deep, 60° at angle and 0.1 R at the bottom were cut. The thus-prepared test pieces were dipped into warm water at 55° C. under a load of 100 kgf/mm$^2$ to determine the length of time until fracture occurred on the test piece.

Figure 3:
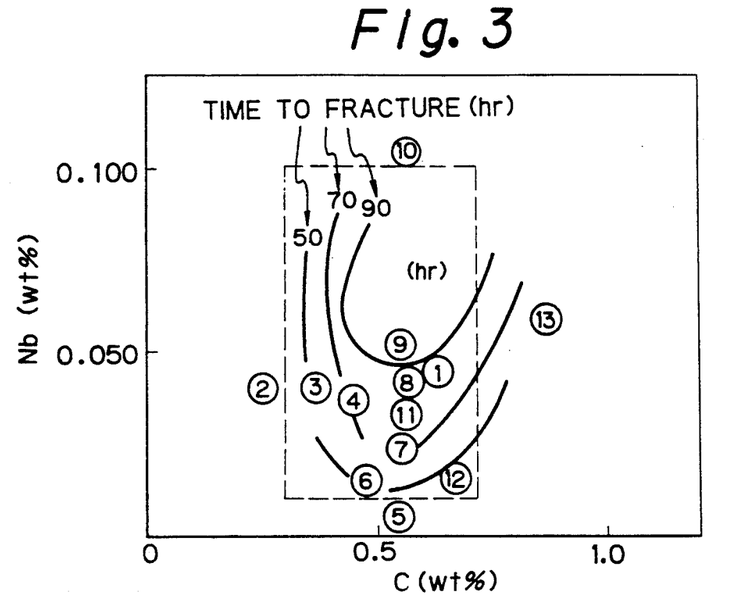
FIG. 3 through FIG. 6 are graphs showing experimental data of the working example.

The test results are shown in Table 1, and the relationship between the length of time and the contents of C and Nb is shown by graphs in FIG. 3 in which the figures within a circle indicates the steel number of Table 1. A broken line indicates the range of the present invention.

In the case of Steel No. 2, a desirable level of strength cannot be attained since the carbon content is much smaller than required. On the other hand, in the case of Steel No. 13 fracture happened in a very short period of time, since the carbon content is much higher than required.

In the case of Steel No. 5 which contains a lower content of Nb, a premature fracture occurred, and Steel No. 6 can exhibit a longer period of time before fracture occurs. In the case of Steel No.10 the Nb content is larger than that required for the present invention. There is no substantial difference in performance from Steel No. 9: therefore, the addition of excess amount of Nb only adds to the manufacturing costs.

EXAMPLE 2

Figure 4:
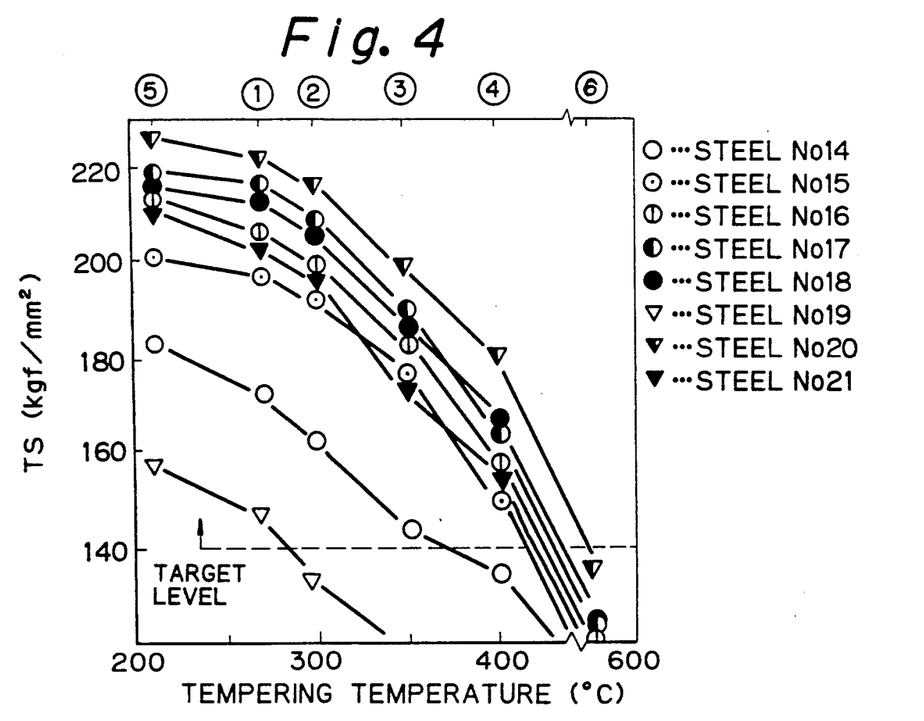

Steels No.14–No.21 with the compositions shown in Table 2 were used to make cold rolled steel plates 1.6 mm thick. After spheroidizing annealing, austempering was applied also under the conditions shown in Table 3. Tensile strength of the resulting steel plates were determined. The test results are shown by graphs in FIG. 4, in which the figures within a circle indicate the number of treatment conditions of Table 3.

It is apparent therefrom that almost all cases of Steel Nos. 14–18 exhibit tensile strength of over 140 kgf/mm$^2$ when they are treated under the conditions of (1) to (3) of Table 3, which are within the range of the present invention.

In contrast, it is difficult to assure a tensile strength of 140 kgf/mm$^2$ or more for Comparative Steel No. 19 even if it is treated under the conditions of the present invention.

EXAMPLE 3

Flat spring hose clamps having a shape shown in FIG. 1 were manufactured through punching and bending from cold rolled steel plates which were produced in Example 2. The resulting flat spring hose clamps were subjected to austempering treatment under conditions shown in Table 3 to provide final products.

The resulting hose clamps having an inner diameter of 40.1 mm, a plate thickness of 1.8 mm, and a plate width of 18 mm were used to connect a steel pipe having an outer diameter of 40.0 mm and a wall thickness of 1.8 mm with a rubber hose having an outer diameter of 48.0 mm, and a wall thickness of 4.5 mm. To this connecting portion a hydraulic pressure was applied from the inside the hose. A critical pressure under which there was no substantial water leakage was determined for each of the hose clamps. The test results are shown in FIG. 5 in which the symbols indicating steels are the same as those in FIG. 4.

Figure 5:
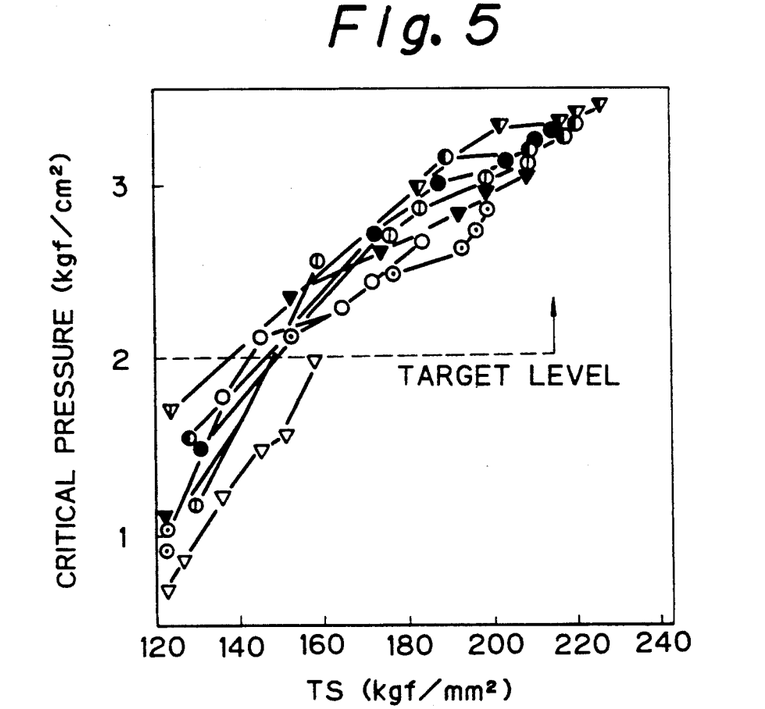

It is apparent from FIG. 5 that hose clamps of the present invention can stand a pressure of 2.0 kgf/cm$^2$ (max) regardless whether they have been austempered under any of the conditions (1) through (5 of Table 3. The hose clamps made of Comparative Steels No. 20 and No. 21 could stand such a high pressure. However, the hose clamps made of Comparative Steel No. 19 and those made of steels including that within the range of the present invention, which were austempered under conditions (6) of Table 3, there was a water leakage at a pressure of 1.5 kgf/cm$^2$, since the steels of which the hose clamps were made have a lower level of tensile strength.

EXAMPLE 4

An accelerated test was carried out in which the flat spring hose clamps manufactured in Example 3 were subjected to a fatigue weakening test at a temperature of 150° C. for 24 hours under the same conditions as in Example 3. An increase in diameter of the ring of the hose clamp after the test was determined for each of the hose clamps. The test results are graphically shown in FIG. 6 in which the symbols indicated are the same as in FIG. 4.

Figure 6:
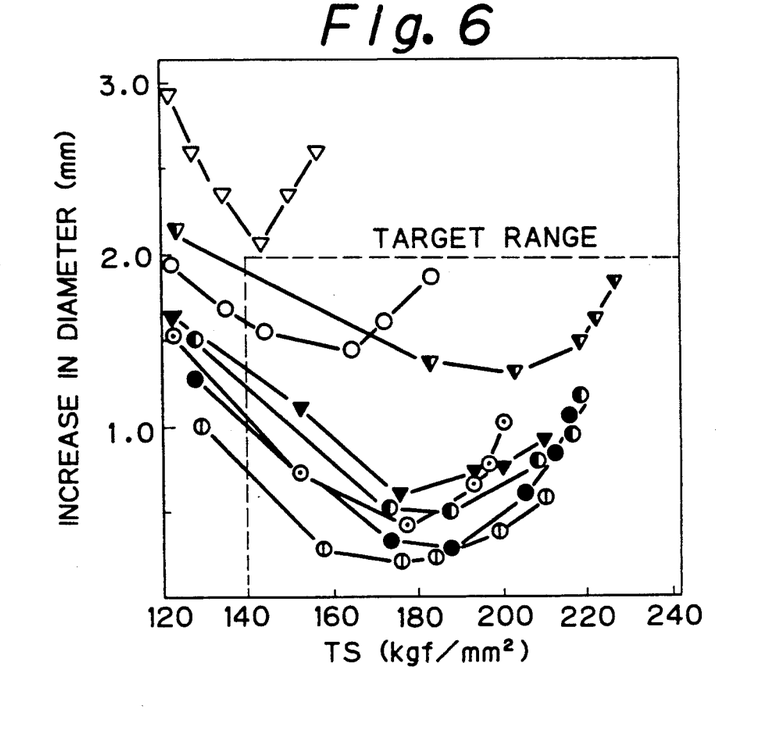

As is apparent from FIG. 6, a change in diameter of the ring is within 2 mm for the hose clamps of the present invention which were made of Steel Nos.14–18 and those made of Steel Nos. 20 and 21. However, the hose clamp made of Steel No. 19, even if it s austempered under the conditions of the present invention, did not satisfy such a criterion.

As the austempering temperature decreases, the change in diameter dimension increases although the tensile strength increases. Therefore, it is desirable that the austempering temperature be adjusted to a level as high as possible within an allowable range of tensile strength.

Figure 7:
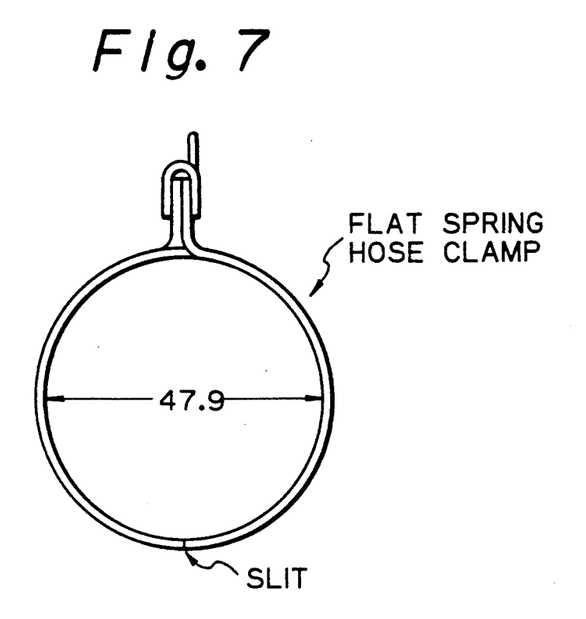
FIG. 7 is an illustration of a brittle fracture test.
Figure 8:
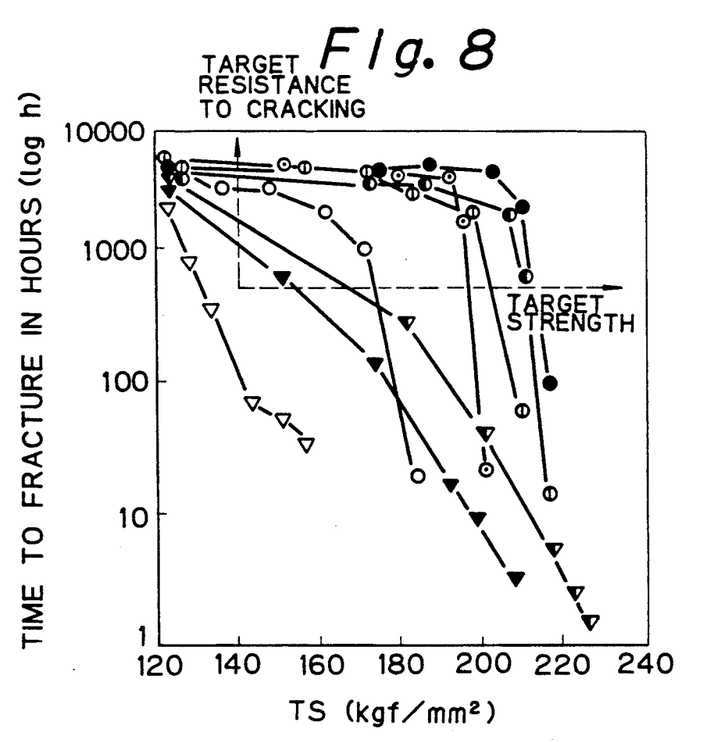
FIG. 8 is a graph showing the test results of the brittle fracture test.

Next, the diameter of the flat spring hose clamps was enlarged to the maximum by contacting the mating members thereof with a slit having a depth of 2.0 mm and a radius of 0.1 mm at the bottom being cut perpendicularly to the circumferential direction as shown in FIG. 7. The thus-prepared hose clamps were dipped into a dilute sulfuric acid solution (0.05N) at 20° C. The test results of this accelerated brittle fracture test are shown graphically in FIG. 8 in which the symbols indicating steels are the same as in FIG. 4. In FIG. 8, the time (in hours) to fracture is plotted logarithmically against the tensile strength of steel sheet.

It is noted from FIG. 8 that the hose clamps of the present invention which were made of Steel Nos. 14–18 and austempered under conditions (1) to (4) and (6) were free from hydrogen cracking for 500 hours. In contrast, some of the hose clamps austempered under conditions (5) suffer from cracking for a shorter period of time. Though it is not shown in the figure, all the hose clamps made from Comparative Steel No. 13 suffer from cracking after a period of time shorter than 500 hours even if they were austempered under conditions in accordance with the present invention.

EXAMPLE 5

Flat spring hose clamps were manufactured from steel compositions shown in Table 4 and austempered under conditions shown in Table 4. The dimensions were the same as those in Example 2. For each of the hose clamps, tensile strength, resistance to spring fatigue weakening, and resistance to brittle fracture in an oxidizing atmosphere were determined. The test results are shown in Table 4.

The spring fatigue weakening test was the same as that carried out in Example 4. The brittle fracture test was carried out in an oxidizing atmosphere at 60° C. at a relative humidity of 100%.

Although the present invention has been described with preferred embodiments it is to be understood that variations and modifications may be employed without departing from the concept of the present invention as defined in the following claims.

TABLE 1

| Steel No. | C | Si | Mn | P | S | Cr | Mo | Ti | Nb | B | sol.Al | N | Austenitizing Temp. (°C.) | Tempering Temp. (°C.) | YS | TS | Resistance to Cracking (hr) |
|---|---|---|---|---|---|---|---|---|---|---|---|---|---|---|---|---|---|
| 1 | 0.57 | 0.18 | 0.36 | 0.011 | 0.005 | 1.02 | 0.38 | Tr | 0.045 | Tr | 0.057 | 0.0048 | 860 | 320 | 146 | 183 | 87.5 |
| 2 | *0.21 | 0.12 | 0.45 | 0.012 | 0.005 | 1.02 | 0.37 | 0.01 | 0.042 | 0.0015 | 0.048 | 0.0047 | 860 | 240 | 90 | 135 | 38.0 |
| 3 | 0.36 | 0.19 | 0.38 | 0.012 | 0.005 | 0.98 | 0.33 | 0.01 | 0.035 | 0.0009 | 0.050 | 0.0046 | 860 | 240 | 126 | 180 | 36.0 |
| 4 | 0.45 | 0.18 | 0.38 | 0.012 | 0.005 | 1.03 | 0.38 | 0.02 | 0.034 | 0.0010 | 0.052 | 0.0044 | 860 | 300 | 142 | 178 | 47.5 |
| 5 | 0.54 | 0.18 | 0.37 | 0.008 | 0.004 | 0.99 | 0.34 | 0.01 | *0.003 | 0.0009 | 0.050 | 0.0046 | 860 | 320 | 148 | 182 | 8.5 |
| 6 | 0.52 | 0.19 | 0.42 | 0.012 | 0.005 | 1.02 | 0.41 | 0.02 | 0.012 | 0.0011 | 0.049 | 0.0047 | 860 | 320 | 149 | 182 | 42.0 |
| 7 | 0.48 | 0.19 | 0.37 | 0.027 | 0.005 | 1.02 | 0.37 | 0.01 | 0.024 | 0.0010 | 0.052 | 0.0044 | 860 | 310 | 150 | 184 | 73.0 |
| 8 | 0.56 | 0.16 | 0.41 | 0.012 | 0.005 | 0.67 | 0.18 | 0.01 | 0.038 | 0.0012 | 0.050 | 0.0046 | 860 | 320 | 148 | 179 | 84.0 |
| 9 | 0.52 | 0.21 | 0.40 | 0.012 | 0.005 | 1.82 | 0.47 | 0.01 | 0.054 | 0.0010 | 0.052 | 0.0044 | 860 | 340 | 147 | 180 | 96.5 |
| 10 | 0.53 | 0.21 | 0.40 | 0.011 | 0.006 | 0.98 | 0.43 | 0.01 | *0.102 | Tr | 0.053 | 0.0043 | 860 | 330 | 152 | 180 | 98.0 |
| 11 | 0.53 | 0.20 | 0.40 | 0.013 | 0.005 | 1.03 | 0.38 | Tr | 0.034 | 0.0010 | 0.051 | 0.0045 | 860 | 330 | 146 | 182 | 72.0 |
| 12 | 0.63 | 0.20 | 0.38 | 0.012 | 0.005 | 0.99 | 0.46 | 0.01 | 0.012 | 0.0012 | 0.052 | 0.0044 | 860 | 360 | 154 | 183 | 62.5 |
| 13 | *0.84 | 0.21 | 0.37 | 0.012 | 0.004 | 1.02 | 0.37 | 0.03 | 0.068 | 0.0010 | 0.053 | 0.0043 | 860 | 390 | 157 | 182 | 22.0 |

Note - *Outside the Range of the Present Invention.

TABLE 2

| Steel No. | C | Si | Mn | P | Cr | Mo | Ti | Nb | B | sol.Al | N |
|---|---|---|---|---|---|---|---|---|---|---|---|
| 14 | 0.34 | 0.20 | 0.35 | 0.012 | 0.76 | 0.34 | 0.01 | 0.04 | 0.0013 | 0.06 | 0.0045 |
| 15 | 0.54 | 0.21 | 0.34 | 0.013 | 1.05 | 0.41 | 0.01 | 0.04 | 0.0012 | 0.05 | 0.0045 |
| 16 | 0.55 | 0.21 | 0.36 | 0.012 | 1.78 | 0.45 | 0.02 | 0.03 | 0.0012 | 0.05 | 0.0048 |
| 17 | 0.54 | 0.19 | 0.81 | 0.012 | 1.04 | 0.43 | Tr | 0.06 | Tr | 0.05 | 0.0046 |
| 18 | 0.67 | 0.24 | 0.36 | 0.010 | 1.04 | 0.28 | 0.01 | 0.06 | 0.0011 | 0.04 | 0.0051 |
| 19 | *0.25 | 0.22 | 0.86 | 0.015 | *0.15 | *0.05 | Tr | 0.03 | Tr | 0.04 | 0.0047 |
| 20 | 0.53 | 0.21 | *1.57 | *0.032 | *0.28 | 0.23 | 0.02 | *Tr | 0.0013 | 0.04 | 0.0043 |
| 21 | 0.57 | 0.21 | 0.45 | 0.016 | 0.98 | 0.25 | Tr | *Tr | Tr | 0.04 | 0.0052 |

Note - *Outside the Range of the Present Invention. Each Steel Contain S in an amount of 0.005–0.006%.

TABLE 3

| | Austempering Conditions | | | |
|---|---|---|---|---|
| ① | 860° C., | 20 min → | 270° C., | 40 min |
| ② | 860° C., | 20 min → | 300° C., | 40 min |
| ③ | 860° C., | 20 min → | 350° C., | 40 min |
| ④ | 860° C., | 20 min → | 400° C., | 40 min |
| ⑤ | *860° C., | 10 min → | 210° C., | 40 min |
| ⑥ | *860° C., | 20 min → | 600° C., | 40 min |

Note *Outside the Range of the Present Invention.

TABLE 4

| Steel No. | C | Si | Mn | P | S | Cr | Mo | Ti | Nb | B | sol.Al | N |
|---|---|---|---|---|---|---|---|---|---|---|---|---|
| 22 | 0.31 | 0.12 | 0.45 | 0.012 | 0.005 | 1.02 | 0.37 | 0.01 | 0.042 | 0.0015 | 0.048 | 0.0047 |
| 23 | 0.36 | 0.19 | 0.38 | 0.012 | 0.005 | 0.98 | 0.33 | 0.01 | 0.035 | 0.0009 | 0.050 | 0.0046 |
| 24 | 0.45 | 0.64 | 0.38 | 0.012 | 0.005 | 1.03 | 0.38 | 0.02 | 0.034 | 0.0010 | 0.052 | 0.0044 |
| 25 | 0.54 | 0.18 | 0.12 | 0.008 | 0.004 | 0.99 | 0.34 | 0.01 | 0.008 | 0.0009 | 0.050 | 0.0046 |
| 26 | 0.52 | 0.19 | 0.87 | 0.012 | 0.005 | 1.02 | 0.41 | 0.02 | 0.012 | 0.0011 | 0.049 | 0.0047 |
| 27 | 0.48 | 0.19 | 0.37 | 0.027 | 0.005 | 1.02 | 0.37 | 0.01 | 0.024 | 0.0010 | 0.052 | 0.0044 |
| 28 | 0.56 | 0.16 | 0.41 | 0.012 | 0.005 | 0.67 | 0.18 | 0.01 | 0.038 | 0.0012 | 0.050 | 0.0046 |
| 29 | 0.52 | 0.21 | 0.40 | 0.012 | 0.005 | 1.82 | 0.47 | 0.01 | 0.054 | 0.0010 | 0.052 | 0.0044 |
| 30 | 0.53 | 0.21 | 0.40 | 0.011 | 0.006 | 0.98 | 0.43 | 0.01 | 0.100 | Tr | 0.053 | 0.0043 |
| 31 | 0.53 | 0.20 | 0.40 | 0.013 | 0.005 | 1.03 | 0.38 | Tr | 0.034 | 0.0010 | 0.051 | 0.0045 |
| 32 | 0.63 | 0.20 | 0.38 | 0.012 | 0.005 | 0.99 | 0.46 | 0.01 | 0.012 | 0.0012 | 0.052 | 0.0044 |
| 33 | 0.64 | 0.21 | 0.37 | 0.012 | 0.004 | 1.02 | 0.37 | 0.03 | 0.068 | 0.0010 | 0.053 | 0.0043 |
| 34 | 0.48 | 0.19 | 0.38 | 0.010 | 0.004 | 1.02 | 0.37 | 0.01 | 0.035 | 0.0010 | 0.051 | 0.0045 |
| 35 | 0.57 | 0.18 | 0.38 | 0.012 | 0.005 | 1.03 | 0.38 | 0.01 | 0.034 | 0.0010 | 0.054 | 0.0042 |
| 36 | 0.49 | 0.24 | 0.39 | 0.012 | 0.005 | 1.08 | 0.43 | 0.01 | 0.033 | 0.0011 | 0.052 | 0.0044 |
| 37 | *0.21 | 0.19 | 0.38 | 0.012 | 0.005 | 0.98 | 0.33 | 0.01 | 0.035 | 0.0009 | 0.048 | 0.0048 |
| 38 | *0.89 | 0.19 | *1.45 | *0.035 | 0.005 | 1.02 | 0.37 | 0.01 | 0.035 | 0.0010 | 0.048 | 0.0048 |
| 39 | 0.56 | 0.16 | 0.41 | 0.012 | 0.005 | 1.04 | 0.45 | 0.01 | *0.001 | 0.0002 | 0.048 | 0.0048 |
| 40 | 0.48 | 0.21 | 0.40 | 0.012 | 0.005 | 1.02 | 0.37 | 0.01 | 0.035 | 0.0010 | 0.048 | 0.0048 |
| 41 | 0.57 | 0.21 | 0.40 | 0.011 | 0.006 | 0.98 | 0.43 | 0.02 | 0.033 | 0.0011 | 0.048 | 0.0048 |

| Steel No. | Austenitizing Temp. (°C.) | Tempering Temp. (°C.) | YS | TS | Change in size due to "fatigue weakening" (mm) | Resistance to Cracking (hr) | Remarks |
|---|---|---|---|---|---|---|---|
| 22 | 860 | 320 | 135 | 165 | 1.9 | 1082 | Present |
| 23 | 860 | 320 | 172 | 208 | 1.7 | 641 | Invention |
| 24 | 860 | 320 | 151 | 189 | 1.6 | 921 | |
| 25 | 860 | 320 | 150 | 182 | 1.4 | 826 | |
| 26 | 860 | 320 | 164 | 193 | 1.4 | 805 | |
| 27 | 860 | 320 | 158 | 190 | 1.5 | 779 | |
| 28 | 860 | 320 | 145 | 178 | 1.3 | 1055 | |
| 29 | 860 | 320 | 160 | 207 | 1.5 | 824 | |
| 30 | 860 | 320 | 148 | 184 | 1.4 | 787 | |
| 31 | 860 | 320 | 151 | 190 | 1.5 | 848 | |
| 32 | 860 | 320 | 150 | 188 | 1.3 | 860 | |
| 33 | 860 | 320 | 156 | 193 | 1.3 | 1194 | |
| 34 | 860 | 400 | 129 | 156 | 1.4 | 1223 | |
| 35 | 860 | 260 | 164 | 218 | 1.5 | 641 | |
| 36 | 860 | 390 | 128 | 154 | 1.4 | 1237 | |
| 37 | 860 | 320 | 112 | 129 | 2.3 | 1251 | Comparative |
| 38 | 860 | 320 | 185 | 228 | 1.8 | 293 | |
| 39 | 860 | 320 | 158 | 182 | 1.4 | 320 | |
| 40 | *910 | *210 | 190 | 232 | 1.7 | 357 | |
| 41 | 860 | *520 | 120 | 128 | 2.5 | 1290 | |

Note - *Outside the Range of the Present Invention.

What is claimed is:

1. A flat spring hose clamp having an improved resistance to brittle fracture and made of a steel having a steel composition consisting essentially of, by weight %:
C: 0.30–0.70%,
Si: 0.70% or less,
Mn: 0.05–1.00%,
P: 0.030% or less,
S: 0.020% or less,
Cr: 0.50–2.00%,
Mo: 0.10–0.50%,
Nb: 0.005–0.100%,
N: more than 0.0020%, but not more than 0.015%,
Ti: 0–0.10% and/or B: 0–0.0020%,
and a balance of Fe and incidental impurities, the steel having a uniform bainite structure.

2. A flat spring hose clamp as set forth in claim 1 wherein
C: 0.40–0.60%.

3. A flat spring hose clamp as set forth in claim 1 wherein
Mn: 0.05–0.80%.

4. A flat spring hose clamp as set forth in claim 1 containing at least one of:
Ti: 0.005–0.10% and B: 0.0003–0.0020%.

5. A flat spring hose clamp as set forth in claim 4 wherein
C: 0.40–0.60%.

6. A flat spring hose clamp as set forth in claim 4 wherein
Mn: 0.05–0.80%.

7. A flat spring hose clamp as set forth in claim 4 wherein
Ti: 0.005–0.10%, and the ratio of Ti/Nb is 0.1–0.7.

8. A flat spring hose clamp having an improved resistance to brittle fracture and made of a steel having a steel composition consisting essentially of, by weight %:
C : 0.30–0.70%,
Si: 0.70% or less,
Mn: 0.05–1.00%,
P: 0.030% or less,
S: 0.020% or less,
Cr: 0.50–2.00%,
Mo: 0.10–0.50%,
Nb: 0.005–0.100%,
sol. Al: 0.10% or less,
N: more than 0.0020%, but not more than 0.015%,
and a balance of Fe and incidental impurities, the steel having a uniform bainite structure.

9. A flat spring hose clamp as set forth in claim 8 wherein
C: 0.40–0.60%.

10. A flat spring hose clamp as set forth in claim 8 wherein
Mn 0.05–0.80%.

11. A method of manufacturing a flat spring hose clamp having an improved resistance to brittle fracture, comprising the steps of heating a steel after forming the steel into a shape of a clamp at a temperature of 800°–900° C. and carrying out austempering by rapid cooling and maintaining the steel at a temperature of 240°–400° C. to form a uniform bainitic structure, the steel having a composition consisting essentially of, by weight %:
C: 0.30–0.70%,
Si: 0.70% or less,
Mn: 0.05–1.00%,
P: 0.030% or less,
S: 0.020% or less,
Cr: 0.50–2.00%,
Mo: 0.10–0.50%,
Nb: 0.005–0.100%,
sol. Al: 0.10% or less
N: more than 0.0020%, but not more than 0.015%,
Ti: 0–0.10% and/or B: 0–0.0020%,
and a balance of Fe and incidental impurities, the steel comprising a uniform bainite structure.

12. A method of manufacturing a flat spring hose clamp as set forth in claim 11 wherein the heating to 800°–900° C. is continued for 3–40 minutes.

13. A method for manufacturing a flat spring hose clamp as set forth in claim 11 wherein the austempering is continued for 10–60 minutes.

14. A method for manufacturing a flat spring hose clamp as set forth in claim 11 wherein the steel contains at least one of
Ti: 0.005–0.10% and B: 0.0003–0.0020%.

15. A flat spring hose clamp having an improved resistance to brittle fracture and made of a steel having a steel composition consisting essentially of, by weight %:
C: 0.45–0.70%,
Si: 0.70% or less,
Mn: 0.05–1.00%,
P: 0.30% or less,
S: 0.2% or less,
Cr: 0.50–2.00%,
Mo: 0.10–0.50%,
Nb: 0.005–0.100%,
sol. Al: 0.10% or less,
N: more than 0.0020%, but not more than 0.015%,
Ti: 0–0.10% and/or B: 0–0.0020%,
and a balance of Fe and incidental impurities, the steel having a uniform bainite structure.

16. A flat spring hose clamp as set forth in claim 15, wherein C: 0.45–0.60%.

17. A flat spring hose clamp as set forth in claim 15, wherein Mn: 0.05–0.80%.

18. A flat spring hose clamp as set forth in claim 15, containing at least one of:
Ti: 0.005–0.10% and B: 0.003–0.0020%.

19. A flat spring hose clamp as set forth in claim 18, wherein C: 0.45–0.60%.

20. A flat spring hose clamp as set forth in claim 18, wherein Mn: 0.05–0.80%.

21. A flat spring hose clamp as set forth in claim 18, wherein Ti: 0.005–0.10%, and the ratio of Ti/Nb is 0.1–0.7.

22. A flat spring hose clamp having an improved resistance to brittle fracture and made of a steel having a steel composition consisting essentially of, by weight %:
C: 0.45–0.70%,
Si: 0.70% or less,
Mn: 0.05–1.00%,
P: 0.30% or less,
S: 0.20% or less,
Cr: 0.50–2.00%,
Mo: 0.10–0.50%,
Nb: 0.005–0.100%,
sol. Al: 0.10% or less,
N: more than 0.0020%, but not more than 0.015%,
and a balance of Fe and incidental impurities, the steel having a uniform bainite structure.

23. A flat spring hose clamp as set forth in claim 22, wherein
C: 0.45–0.60%.

24. A flat spring hose clamp as set forth in claim 22, wherein
Mn: 0.05–0.80%.

* * * * *